United States Patent
Hause

[15] 3,656,407
[45] Apr. 18, 1972

[54] RADIAL PISTON PUMP

[72] Inventor: Gilbert K. Hause, Bloomfield Hills, Mich.
[73] Assignee: General Motors Corporation, Detroit, Mich.
[22] Filed: June 1, 1970
[21] Appl. No.: 42,263

[52] U.S. Cl.................................................91/490, 91/494
[51] Int. Cl.........................................................F01b 13/06
[58] Field of Search..................91/490, 491, 494, 495, 497; 92/169, 171, 162

[56] References Cited

UNITED STATES PATENTS

| | | | |
|---|---|---|---|
| 1,243,494 | 10/1917 | Dunning | 91/495 |
| 2,977,891 | 4/1961 | Bishop | 91/494 |
| 3,274,946 | 9/1966 | Simmons | 91/490 |
| 2,815,718 | 10/1957 | Avery | 91/498 |
| 2,403,427 | 7/1946 | Ludeman | 92/162 |
| 2,419,059 | 4/1947 | De Villiers | 91/494 |
| 1,398,788 | 11/1921 | Mayer | 91/494 |
| 1,852,335 | 4/1932 | Rosen | 91/497 |
| 3,058,429 | 10/1962 | Rocheville | 91/495 |

*Primary Examiner*—William L. Freeh
*Attorney*—W. E. Finken and A. M. Heiter

[57] ABSTRACT

A hydrostatic pump or motor having a fixed pintle and a spider having radial pistons fixed thereon and rotatably mounted on the fixed pintle. Each piston has a spherical head cooperating with a cup like cylinder supported in an annular bearing ring which is rotatably mounted on an axis eccentric to the spider axis. The spider and ring are driven at the same speed by a pin and cam drive. In one embodiment, the power shaft directly drives the ring which drives the spider through a pin and cam mechanism for rotation at the same speed. In another embodiment, the power shaft directly drives the spider which drives the ring through a pin and cam mechanism. The pin and cam drive mechanism has a pin with a rotary bearing thereon fixed to one of the spider or ring, and the other has a circular cam with relieved portions at the radially inner and outer portions of the circular cam located between each pair of pistons. Each cup cylinder member is mounted on the ring by a universally pivoted stud or by a cylindrical caged roller bearing having limited movement relative to the cup member cooperating with the base of the cup member to provide free sidewalls for uniform expansion. The cup members have fluid supported sleeves to limit expansion. The pintles may have an enlarged eccentric portion to support the spider and a reduced portion so the rotary housing can be rotatably mounted on two small diameter bearings of the same size.

26 Claims, 9 Drawing Figures

PATENTED APR 18 1972 3,656,407
SHEET 2 OF 4
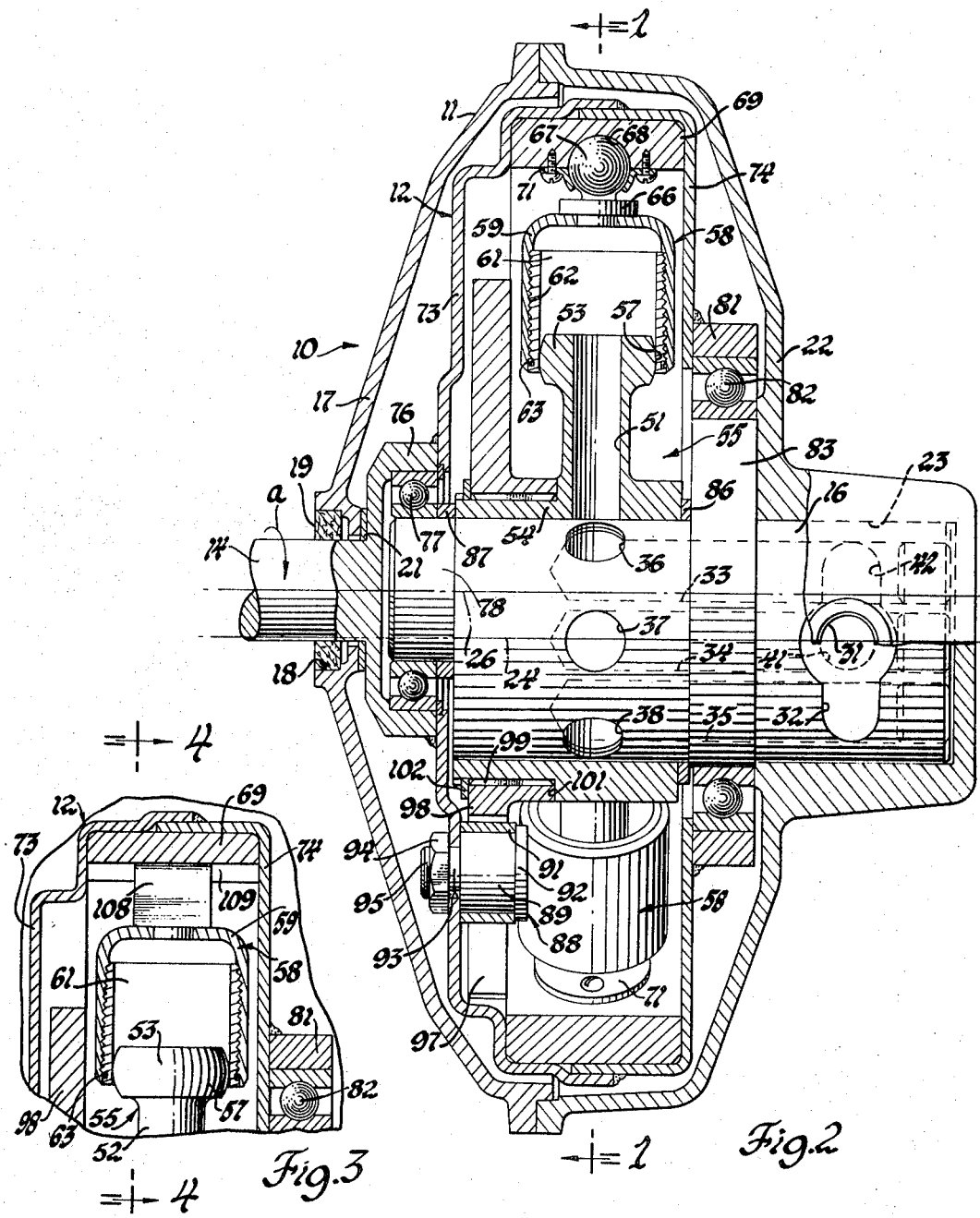
Fig.2
Fig.3
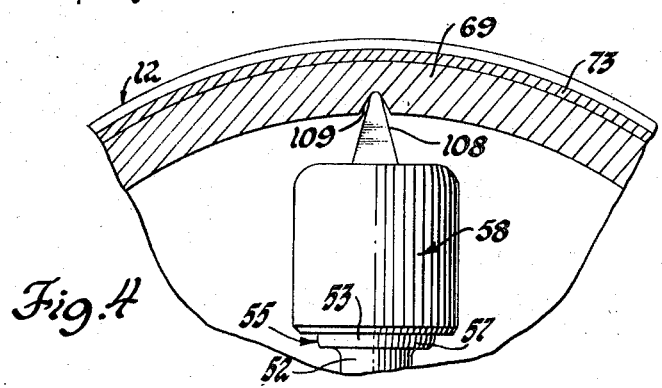
Fig.4
INVENTOR.
Gilbert K. Hause
BY
A. M. Heiter
ATTORNEY

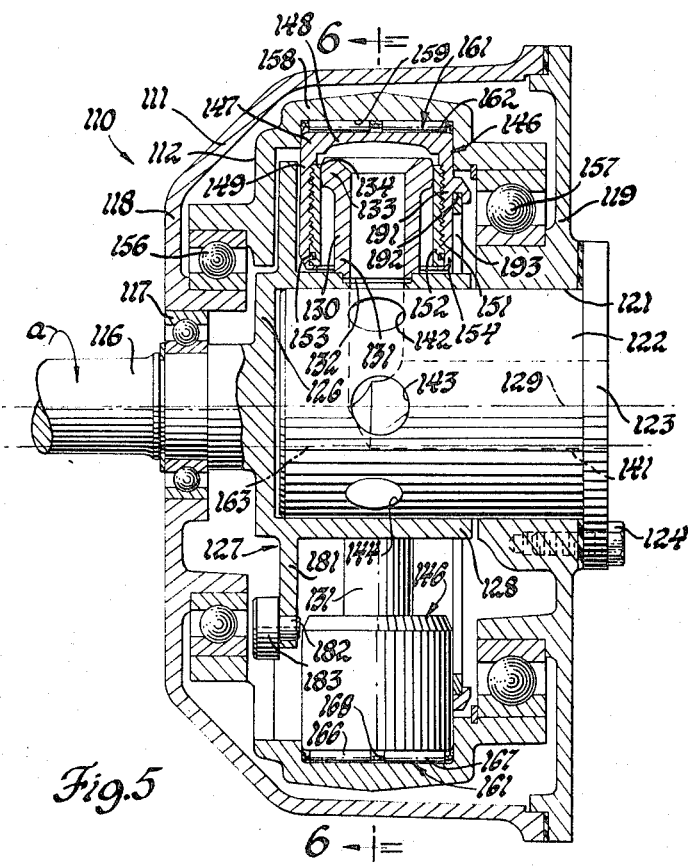
Fig.5
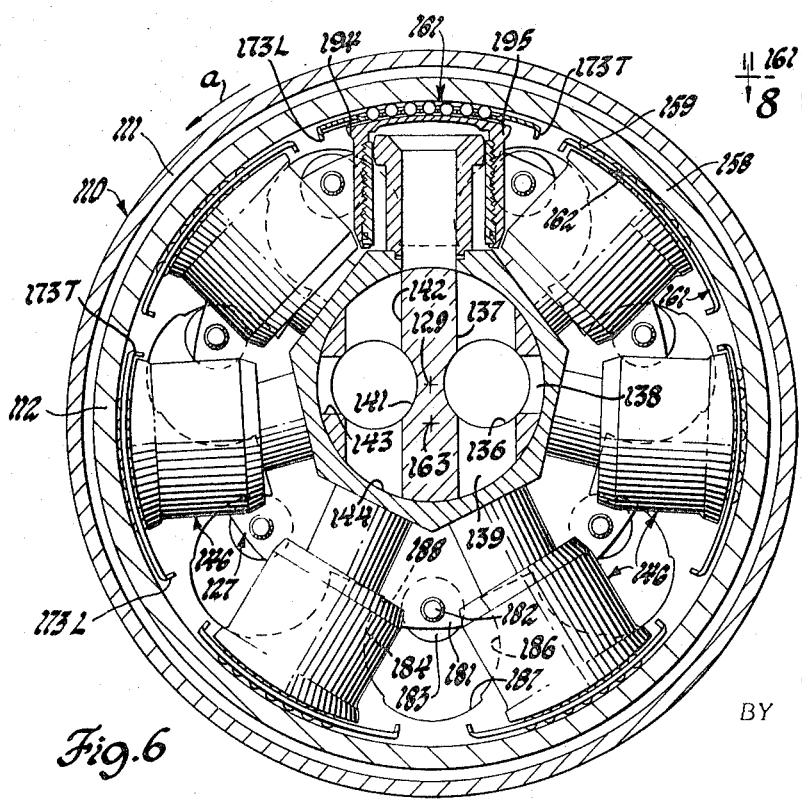
Fig.6
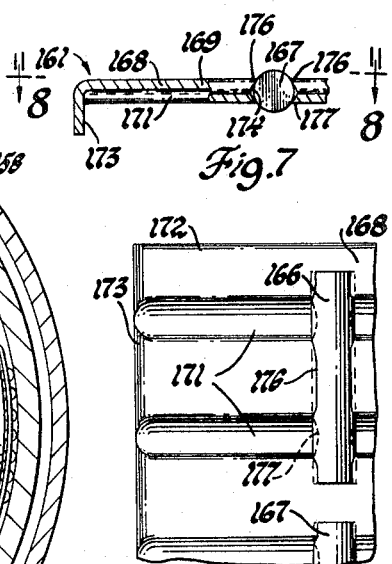
Fig.7
Fig.8
INVENTOR.
Gilbert K. Hause
BY
A. M. Heiter
ATTORNEY INVENTOR.
Gilbert K. Hause
BY
A. M. Heiter
ATTORNEY

RADIAL PISTON PUMP

This invention relates to hydrostatic converters and particularly to such units having a radial arrangement of pistons and cylinders.

This invention provides in hydrostatic converter units having a fixed pintle and a spider rotatably mounted about one axis and a ring mounted on an axis eccentric to the spider axis for operating pistons and cylinders through an intake and discharge stroke, an improved drive mechanism for providing a drive between the spider and ring members to cause them to rotate at the same speed. The drive mechanism has a pin with a bearing surface thereon fixed to one member. The bearing surface engages a circular cam on the other member. One of these pin and cam units is located between each piston and cylinder. The cams are located on the leading and trailing sides of the circle and are relieved over a substantial length at the radially inner and outer portions to make it unnecessary to maintain overly critical tolerances in the concentricity of the parts. The cylindrical walls of the cylinder member have a uniform thickness and a fluid pressure supported liner and are solely supported through the base which is mounted on the ring for relative tilting movement with respect to the piston. In one arrangement the power shaft drives the ring for rotation on a fixed pintle about the shaft and ring axis and through a pin and cam mechanism drives the spider mounted for eccentric rotation on the pintle. Cylinders are pivoted to the ring so the cylinders tilt relative to the pistons fixed to the spider during rotation. In another form of the invention, the power shaft drives the spider mounted for rotation on the fixed pintle and about the shaft and pintle axis and the spider through a pin and cam drive rotates the ring about an eccentric ring axis. The pistons are fixed on the spider and the cylinder cup member base is a cylindrical bearing portion supported by roller bearings on the ring member with the roller bearings confined in a cage having limit stops to limit the excursion of the cage and roller bearings beyond that required during operation of the hydrokinetic converter unit.

An object of the invention is to provide in a hydrostatic converter unit having a pair of eccentrically mounted members, a pin and cam circle drive mechanism consisting of a plurality of pins mounted on one member and a plurality of cam circles mounted on the other member having relief at the inner and outer radial portions.

Another object of the invention is to provide in a hydrostatic converter unit having a pair of eccentrically mounted members, a pin and cam circle drive mechanism consisting of a plurality of pins mounted on one member and a plurality of cam circles mounted on the other member having relief at the inner and outer radial portions and leading and trailing cam surfaces extending for 75° to 105° symmetrically about a circle through the cam circle centers.

Another object of the invention is to provide in a hydrostatic converter having a piston and a cup shaped cylinder having a cylindrical liner sleeve having its exterior surface spaced from the interior surface of the cylindrical portion of the cup shaped cylinder, sealed to said cup shaped cylinder at the lip to provide a fluid space between said liner sleeve and said cylindrical portion in communication with the cylinder chamber and fixed to the cup shaped cylinder.

Another object of the invention is to provide in a hydrostatic converter having a piston with a spherical surface cooperating with an internal cylindrical surface of a cup shaped cylinder assembly solely supported on its base for reciprocation relative to the piston and the cup shaped cylinder assembly including a cup shaped member having an internally threaded cylindrical portion and a base and an externally threaded cylindrical liner sleeve with the threads having clearance to provide a fluid space between the liner sleeve and cylindrical portion which is open to the interior operating chamber of the cup shaped cylinder assembly adjacent the base of the cup shaped member for fluid communication with the chamber and is sealed and mechanically fixed at the lip of the cup shaped cylinder and having an internal cylindrical bore contacting a circle of said spherical surface of said piston to equalize pressure on both sides of the liner sleeve contacted by the fluid under pressure to overbalance the internal fluid pressure and maintain a compressive force on said liner sleeve for dimensional stability.

These and other objects of the invention will be more apparent from the following drawing and description of the preferred embodiments:

FIG. 1 shows a partial cross-sectional view of one embodiment of the radial piston hydrostatic converter.

FIG. 3 is a partial view in longitudinal section showing a modified piston pivot.

FIG. 4 is a partial view in cross section of this modified piston pivot.

FIG. 5 is a longitudinal partial sectional view of a modified radial piston converter unit.

FIG. 6 is a cross section view of FIG. 5 on the line 6:6.

FIG. 7 is a partial sectional view of the bearing assembly.

FIG. 8 is a partial plan view of the bearing assembly.

Figure 2:
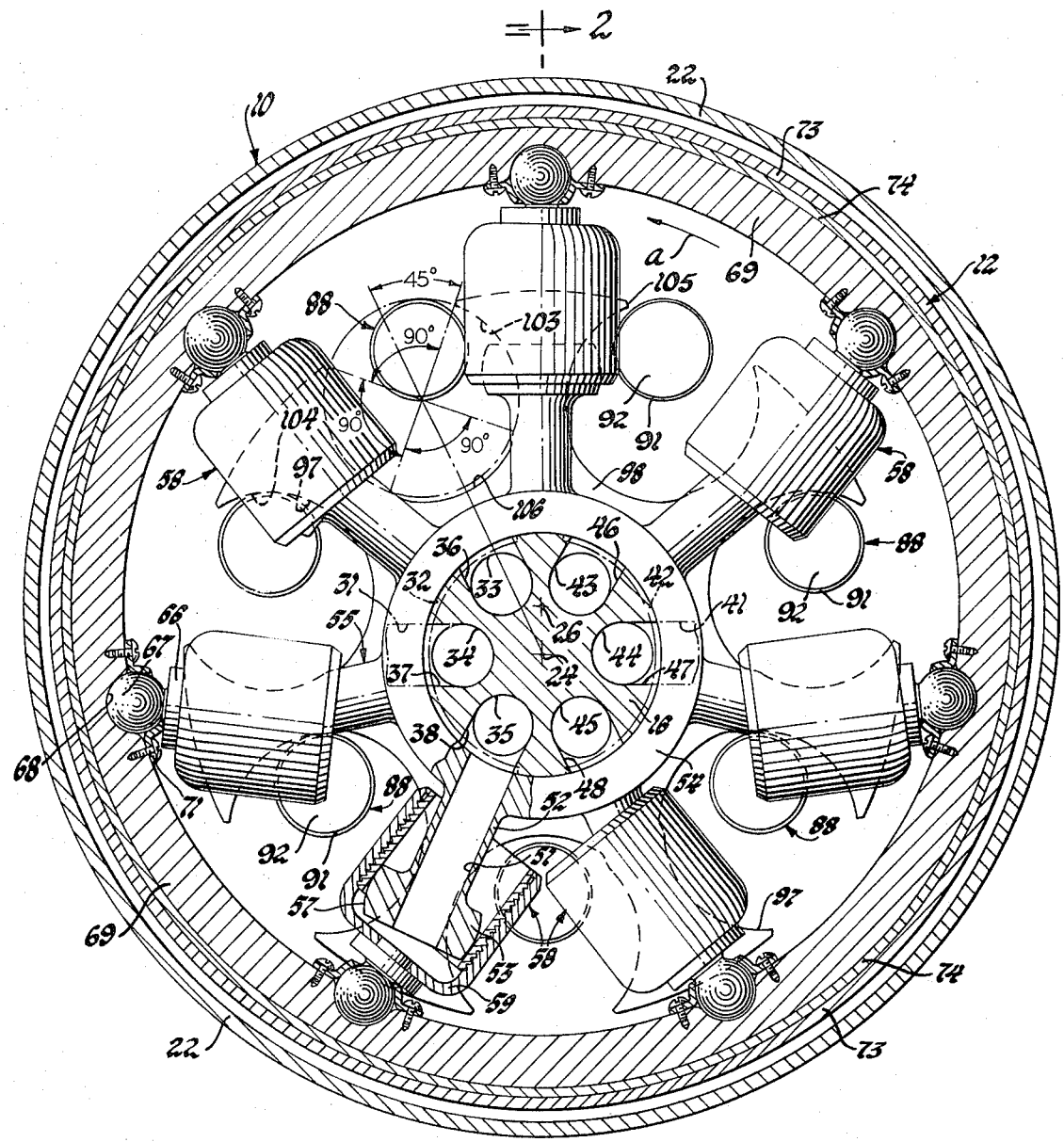
FIG. 2 is a sectional view of FIG. 1 on the line 2:2 showing a longitudinal partial section of this converter unit.

The invention as illustrated in the hydrostatic converter 10 shown in FIGS. 1 and 2, has a stationary housing 11 and a rotary housing 12 fixed to the power shaft 14 and rotatably mounted on the fixed pintle 16. The housing 11 has a front section 17, having an opening 18 having a seal 19 cooperating with the shaft 14 and a thrust bearing 21, and a rear section 22 secured at the outer perimeter to the front section 17 by suitable bolts. The rear section has an eccentric cylindrical bore 23 within it to receive and secure or fix the pintle 16 to the stationary housing 11. The pintle has a centerline or axis 24, which is offset from the power shaft 14 and rotary housing 12 which rotate on centerline or axis 26. When the power shaft 14 and rotary housing 12 rotate clockwise, as viewed from the power shaft end of the hydrostatic converter, as indicated by the arrow *a* in FIGS. 1 and 2, there is flow from inlet port 44 through the ports and passages described below to the outlet port 31. The fluid outlet port 31 in the rear portion 22 of stationary housing 11 provides a fluid connection for exhausting fluid through the outlet opening 32 in the pintle which connects to each of the three axial outlet passages 33, 34 and 35 and the pintle outlet ports 36, 37 and 38 as shown in FIG. 1. The housing 22 has, diametrically opposite outlet port 31, an inlet port 41 which connects through the pintle inlet opening 42 and the three inlet passages 43, 44 and 45 which connect to inlet pintle ports 46, 47 and 48. These inlet and outlet pintle ports are circumferentially aligned with the annular row of passages 51 which extend through each stem portion 52 and piston 53. The annular series of pistons 53 each have their stem portion 52 secured or formed integrally with the cylindrical hub portion 54 of the rotary spider 55. The hub 54 has a central cylindrical bore rotatably mounted on the pintle 16 to rotatably support the pintle about pintle axis 24. Each piston 53 has a spherical surface 57 which has line seal contact, no clearance, with the inner wall of the cooperating cylinder 58. Each cylinder 58 is formed of a cup shaped portion 59 and a cylindrical liner sleeve 61. The cylindrical portion of the cup 59 and the cylindrical liner 61 have loose matching threads so that a space is provided between the cylindrical portion of the cup and the liner for fluid under pressure during the operation of the pump. The seal 63, illustrated as an O ring in a groove, between the liner and cup near the cup lip seals the space at the lip of the cup. The other end of the liner is not sealed to the cup so the space is in fluid communication with the interior of the cylinder cup. The cup and liner are staked when in the assembled position to prevent relative rotation so the threads structurally hold the liner in position in the cup. Since the fluid pressure within the cylinder is also present between the liner and the cup, there is substantially no stress on the liner and it will not expand or expansion will be substantially inhibited due to fluid pressure in the cylinder. Thus the line seal contact, no clearance, is maintained by this equalized pressure on both sides of the liner which is lightweight relative to the operating pressure which acts on a larger area on the exterior surface of the liner than on the interior surface of the liner to overbalance the expanding force of the internal fluid pressure and maintain a compressive force on the liner sleeve for dimensional stability. Thus, the cylinder wall of the liner will not expand due to fluid pressure therein and increase the clearance causing leakage. The cut portion is of lightweight construction relative to the operating fluid pressure so the cup expands under pressure. Since the cup member has free sidewalls the expansion is uniform. The sleeve is of similar lightweight construction and would expand under the internal fluid operating pressure but for the supporting equal pressure providing overbalancing external pressure force. The loose threads on the exterior of said liner sleeve and the interior of the cup provide the space therebetween, reinforcing ribs for both and secure the sleeve in the cup.

Air which may be trapped in the space between the sleeve 61 and the cup member 59 may be used to smooth or cushion pressure change shock or this effect may be reduced or eliminated by packing this space with a light grease during assembly to match this effect for optimum silencing.

The ball stud 66 is welded to the base of the cup 59 and has a ball end 67 fitting in a semi-spherical bearing recess 68 in the ring 69, and retained in place by the retainer ring 71, which has a suitable spherical seat part engaging the ball and is secured to the ring 69. This ball stud mounting permits rotation of the cylinder relative to the piston to obtain more uniform wear and greater durability. The rotary housing 12 has a forward portion 73 having a sheet metal disc and drum portion and a rear sheet metal portion 74 having a disc and a drum portion. The ring 69 is secured within the drum portions which are welded together to secure the front and rear rotary housing portions together. The inner perimeter of the disc portion of the forward portion 73 is welded to a flange 76 of the power shaft 14. The front portion of the rotary housing and shaft 14 is supported by bearing 77 on a cylindrical eccentric support portion 78 on the pintle 16 which is coaxial with shaft 14 on axis 26 and thus eccentric to the pintle axis 24. The rear portion 74 has welded thereto a circular bearing support member 81 which is mounted by the bearing 82 on the cylindrical bearing support portion 83 all coaxial with axis 26 and eccentric to the pintle axis 24. Thrust bearings 86 between bearing support 83 and spider 55, thrust bearings 87 between the spider 55 and bearings 77 and thrust bearing 21 between power shaft flange 76 and the fixed housing and the bearings 77 and 82 axially locate the respective parts to which they are attached.

A pin 88, having a cylindrical bearing portion 89, which receives the bearing sleeve 91, retained axially in place by the head 92 extends through an aperture 93 in the disc portion of front portion 73 of the rotary housing 12 and is secured in place by the nut 94 threaded on the threaded portion 95. Each pin assembly has a center equidistant from axis 26 of ring 69, equally annularly spaced and located between the centers of pivots 66,67 and cooperates with a circular cam 97 in an indexing plate 98 secured by splines 99 and held against the shoulder 101 by the snap ring 102 on the spider 55. There is a pin and cam drive device centrally located between each piston and cylinder. As best shown in FIG. 1, the openings 97 have circular cams 103 and 104 having a center centrally between the pistons and equidistant from axis 24 located symmetrically about the diameter perpendicular to the radius through pintle and spider axis 24, and extending for about 90°. Thus, there is provided an opening clearance 105 at the outer perimeter and a relief clearance 106 at the inner perimeter. Each of these clearances, the opening clearance and relief clearance portions extend about 90° and prevent any wedging action between the pin and circular cam surfaces due to tolerance variations of the device such as the axis of rotation of the rotary housing and/or spider.

When this hydrostatic converter is used as a pump with the power input shaft 14 driving the rotary housing 12 and its ring member 69 and driving, through the pin and cam drive, the spider 55, the cylinders 58 rotate about the axis 26 and the pistons 53 rotate about axis 24. The cylinders reciprocate and tilt with respect to the pistons 53 in the sequence illustrated in FIG. 1. The ring 69 and cylinders 58 are rotated in a coordinated movement with respect to the spider 55 and pistons 53 by the drive connection provided by the pin assembly 88, and the circular cams 103 and 104 in the indexing plate 98. It is preferred that the cam circles be as large as possible within the structural limits of the spider and ring. The pin bearing radius must be less than the radius of the cam circle by the eccentricity to permit the relative annular movement of the spider and ring as illustrated in FIG. 1. The pin and its bearing is made with a large diameter, preferably at least half as large as the cam circle diameter so the mechanism has sufficient strength and rigidity and rolling contact over an arcuate engagement area for maximum durability. As shown in FIG. 1, the pin engages the leading cam 103 when the pistons and cylinders are in the pump suction stroke or motor power stroke where the cylinder chamber expands and approaches the fully expanded position at the top of FIG. 1 and the pin engages the trailing cam 104 as the pistons leave the fully expanded position and move toward the fully contracted position on the pump delivery stroke or motor exhaust stroke. A cam of about 90° is preferred, with seven pistons, since this cam does not provide a radial force larger than the indexing force and one pin will be in established engagement with the cam when another leaves or engages the cam for continuous indexing drive contact centrally of the cam surface. Thus, there is a positive drive between the ring and spider. The ring and spider are also mounted on bearings and the cylinder is pivoted on the ring so there is very little friction. When the power shaft 14 is driven as an input shaft in the direction of arrow a, fluid is drawn in through housing inlet port 41 and the inlet ports 46, 47, 48 and supplied via outlet ports 36, 37, 38 and connecting passages to the housing outlet port 31.

If fluid under pressure is supplied via the inlet port 41, and the connecting passages to the inlet ports 46, 47 48, the converter will be driven as a motor driving power shaft 14 as an output shaft in the direction of arrow a and the fluid exhausted through the outlet passages to outlet port 31.

The modification, shown in FIGS. 3 and 4, has the same fixed housing 11, rotary housing 12, power shaft 14 and pintle 16 and like reference numerals have been applied to indicate like parts. The cylinder 58, instead of having a ball stud 66, has a wedge pivot stud 108 which is pivotally located in a slot 109 in the ring member 69. This modification provides a friction free pivot on an axis coaxial to the axis 26 for each of the cylinders 58. The cylinder and piston members are made of the same material or materials having the same coefficient of expansion so change of temperature does not cause added leakage due to differential expansion. The fluid supported liner minimizes leakage which would be caused by high pressure expanding the cylinder walls. The pivots in FIGS. 1 to 4 are attached to the base of the cup cylinder member and thus have minimum interference with the expansion and contraction of the cylindrical sidewall portion.

The modified hydrostatic converter 110, as shown in FIGS. 5 to 8, has a stationary housing 111, a rotary housing 112 and a power shaft 116 rotatably mounted by the bearing 117 in the front wall 118 of the stationary housing. The stationary housing 111 has a rear wall portion 119 secured to the front wall portion by suitable bolts, not shown, and having an opening 121 receiving the cylindrical pintle 122 which has a flange 123 at its rear end suitably secured by screws 124 to the fixed housing. The power shaft 116 has a drive flange 126 fixed thereto which drives the spider 127 which has a cylindrical bearing portion 128 rotatably mounted on the pintle 122 for rotation with the power shaft 116 and spider 127 about the common axis 129. The spider 127 has annular series of radial pistons 130 each having a hollow stem portion 131 secured to the cylindrical portion 128 of the spider at the perimeter of the plurality of spider ports 132 arranged in an annular series. The pistonhead 133 has a spherical surface 134 for contact with the cylinder wall.

The pintle 122 has an axial outlet passage 136 connecting with outlet ports 137, 138 and 139 and an axial inlet passage 141 connecting with inlet ports 142, 143 and 144 which sequentially connect with the spider ports 132. The slipper cylinders 146 have a cup shaped cylinder member 147 having a base portion 148 and a cylindrical sidewall portion 149 which has internal threads 151 to receive the externally threaded sleeve member 152. The threads are loose to provide a fluid space between the cylinder member and liner sleeve. This space is in open communication with the cylinder near the base of the cup member and is sealed by an O ring seal 153 in a groove near the lip of the cup member and the cup member is knurled over at 154 to hold the threaded parts together.

The rotary housing 112 is supported by a bearing 156 on the front wall 118 and a bearing 157 on the rear wall 119 of the stationary housing and has a cylindrical ring portion 158 having an internal cylindrical bearing surface 159 which is in rolling contact with the needle bearing assembly 161 which also engages the slipper bearing surface 162 on the base 148 of the piston cup member 147. The bearing surface of ring 158 is a cylindrical surface about the axis 163 eccentric to axis 129. The slipper bearing surface 162 is cylindrical about the same axis and has a radius less than the cylinder 159 by the thickness or diameter of the rollers 166, 167 of the bearing assembly 161.

Bearing assembly 161, shown in detail in FIGS. 7 and 8, has a plurality of axially aligned pairs of rollers 166 and 167 which are rotatably retained in the cage 168. The cage 168 has a plate portion 169 which is cylindrically shaped to fit within the ring 158 and between the ring's cylindrical internal bearing surface 159 and the external cylindrical bearing surface 162 on the cup member. The cylindrical sheet metal plate portion 169 has a plurality of longitudinally extending stiffening ribs 171 formed therein and an edge rib 162 at each edge and an end rib and stop 173 at each end projecting radially inwardly from said plate portion.

A partial circular opening 174 is formed through the plate 169 and its stiffening ribs 171 so that the plate has a surface 176 engaging the roller above the center and the bottom of the rib has a surface 177 engaging the rollers below the center line on opposite sides to retain the rollers in the plate. The intermediate portion of the ribs is preferably relieved from contact with the rollers to reduce friction.

The indexing or positive drive mechanism consists of an annular plate 181 formed integrally with or secured to the cylindrical portion 128 of the spider 127 and has a plurality of pins 182 secured thereto each having a cylindrical bearing surface or cam follower 183 which cooperates with the trailing cam surface 184 and the leading cam surface 186 which have the recessed clearance 187 and the opening 188 therebetween. The cam surfaces and the clearances each extend for about 90°.

The pins 182 have centers located centrally between the pistons and equidistant from the spider axis 129. The circular cams have centers equally spaced from ring axis 163 and equally annularly spaced. Normally about 90° of cam surface is sufficient. In a seven piston unit 104° of cam surface will provide a minimum contact between two successive pins and the leading cam and at the opposite side of the unit or similar minimum contact between two successive pins and the trailing cam. However, the 90° or less cam arrangement is preferred because the radial forces are never larger than the indexing force and when each pin is engaging or leaving the cam another pin is in established contact with the cam. The spider 127 drives the ring 158 and as in FIG. 1, these elements rotate at the same speed about their eccentric centers or axes for relative reciprocation of the pistons and cylinders. Also it is preferable that the cam follower or bearing 183 on the pins 182 have an outer diameter at least half as large as the diameter of the cam surfaces 184 and 186 so the cantilever mounted pin 88 is rigid and rigidly mounted to the forward portion or wall 73. There is one pin and cam drive for each piston and cylinder and the pins and cams are centrally located between each piston and cylinder for clearance. The pins are uniformly spaced on an annulus about the spider axis and fixed to the spider while the cams are uniformly spaced on an annulus about the ring axis and rotate with the ring.

Each cup member 147 has at the side an integral or attached guide portion 191 having a short segment of an internal annular groove or recess 192 aligned with the cylindrical bearing surface 162 also on the cup member. An annular ring 193 fits into the recess 192 on each cup member to prevent rotation of the cup members about the piston during rotation of the cup members about axis 163 so the cylindrical bearing surface 162 runs true on bearing assembly 161.

For use as a pump, the power shaft 116 is driven as the power input shaft in a clockwise direction as viewed from the shaft end of the unit and indicated in FIG. 5 by the arrow $a$, and counter-clockwise as viewed from the rear end and shown in FIG. 6. Then the input shaft 116 drives the spider 127 and the pistons 130 thereon and through the indexing pins 182 and index plate 181 drives the rotary housing 112 in unison or at the same speed. The spider and pistons and cylinders and ring 158 rotate in the direction as indicated by the arrow $a$ as shown in FIG. 6. During this rotation, as each piston rotates, it assumes the position of the illustrated individual pistons at that position. As each piston and cylinder moves from the top center position, FIG. 6, where the piston chamber has minimum volume, the piston and cylinder units each successively move counter-clockwise, arrow $a$, over the inlet ports 142, 143 and 144 during the suction stroke and the chambers fill during this half cycle of movement as the chambers in the cylinders expand. At the end of this suction half cycle the chambers have maximum volume. Then in the next half cycle, the discharge cycle, the volume of the expansible chambers is reduced to supply fluid under pressure to the outlet ports 137, 138 and 149. Due to the eccentricity between the spider axis and the ring axis, the cylinders are closest to the spider axis at top dead center and on the suction stroke or first half cycle move further away from the spider axis about which they rotate in proportion to the distance from the top dead center to the bottom center or maximum volume fully charged position. On continued movement in the discharge stroke or second half cycle, the pistons return to the minimum volume position. At the top center minimum volume and bottom center maximum volume position the piston and cylinder centerlines of reciprocation coincide while intermediate these positions these centerlines are at an angle to each other. Also, as the cylinders are radially spaced further from the axis 128, they are annularly spaced further apart. Since the spider and ring rotate at the same speed, R.P.M. and the internal bearing surface of the ring has a larger diameter about its axis 163 than an imaginary circle about axis 128 contacting the bearing surface circle at top center, it will be seen that a point on the ring moves a greater distance than the same point on the spider and thus must move faster. Thus, on the suction stroke or first half cycle, the ring first moves faster than the cylinder and then moves slower than the cylinder. At bottom center they are momentarily moving together or at the same speed and then on the discharge stroke or second half cycle the ring first moves slower than the cylinder and then moves faster than the cylinder so they again move together at top center position. This relative movement or excursion movement between the ring and cylinders is accommodated by the bearing assembly 161 which is centered on the cylinders at top center as shown in FIG. 6. Thus, there is a maximum clearance between the leading edge 194 of the cup member 147 and the leading edge stop 173L in the top center position and this clearance, as the ring first moves faster than the cup, progressively increases during a first portion and then, as the ring moves slower than the cup, progressively reduces as the cup approaches bottom center where the bearing assembly 161 is also centered on the cup member. Then in the first portion of the discharge stroke, as the ring moves slower than the cup, this clearance decreases. Then in the latter portion of the discharge stroke as the ring moves faster than the cup this clearance gradually increases as the cup moves to top center to regain the original clearance and the ring and cup momentarily move at the same speed. The clearance is sufficient so that at the maximum excursion positions, about one fourth and three fourth cycle positions, there should normally be some small clearance remaining but the stop will prevent drift when the pump is not being used. The trailing edge clearance between the trailing edge 195 of the cup 147 and the trailing stop 173T of the bearing assembly 161 is the same. Note that on the suction stroke trailing edge stop 173T would be effective and that on the discharge stroke leading edge stop 173L would be effective.

This hydrostatic unit, FIGS. 5 to 8, will function as a motor when fluid under pressure is supplied to the inlet port 121 and the outlet port 136 is connected to a lower pressure or exhaust and will operate in the same manner to drive the input shaft in the direction of arrow *a*. The pin and cam drive mechanism will similarly drive the ring 158 so that there is the same excursion movement between the cylinders and ring and the same limited movement of the bearing assemblies 161.

Figure 9:
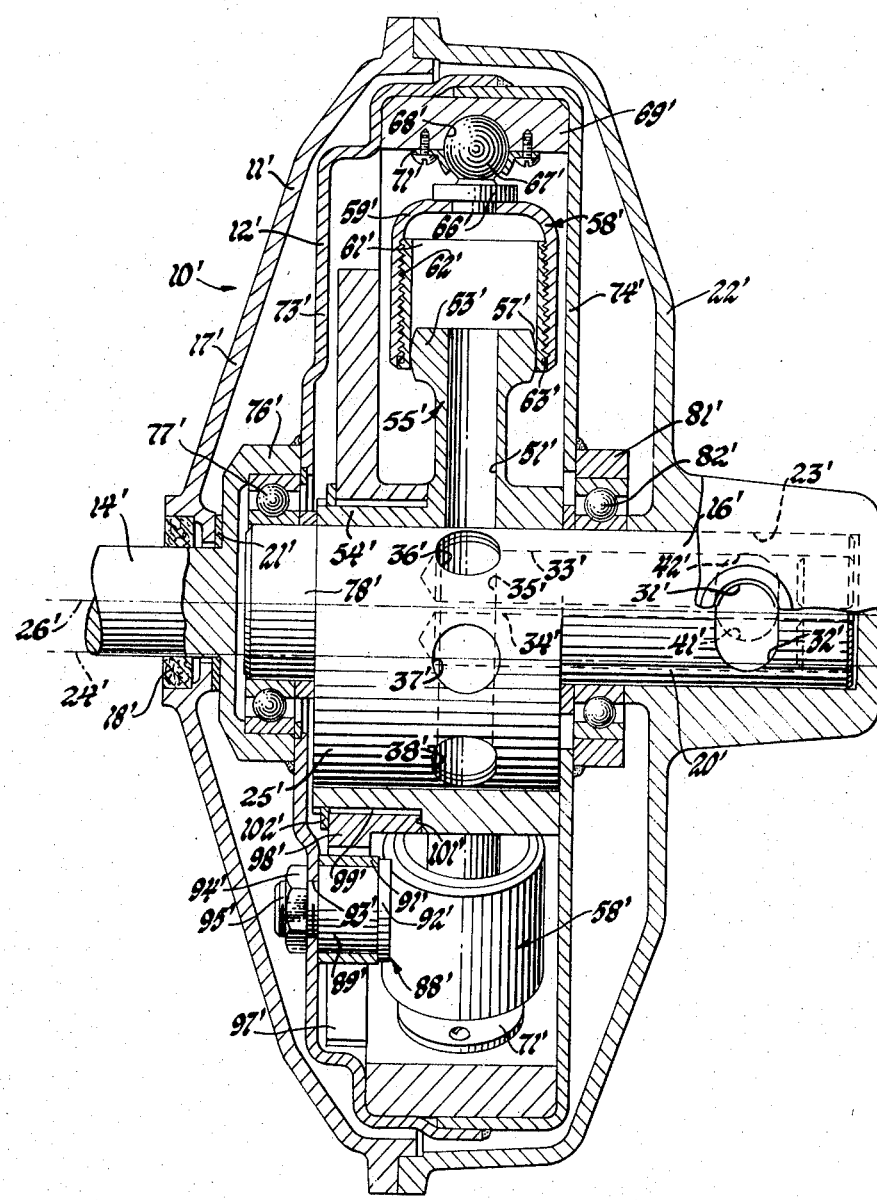
FIG. 9 is a longitudinal view with parts in section of another modified radial piston hydrostatic converter unit.

FIG. 9 is a modification of FIG. 1 in which the pintle 16' is modified so that the bearings 77' and 82' have the same diameter. Since the basic configuration of this hydrostatic converter 10', the fixed housing 11' and the rotary housing 12' and the input shaft 14', the spider assembly 55' and the cylinders 58' are the same as described above with regard to FIGS. 1 and 2, only the modified parts are described below. The stationary housing 11' has a smaller cylindrical bore 23' which is concentric with the input shaft and spider axis 26. The stationary housing also has an outlet port 31' and diametrically opposite, an inlet port 41'. The outlet port 31' connects to a pintle port 32' which connects to both the axial outlet passages 33' and 34' which are connected by a transverse passage 35' to the outlet ports 36', 37' and 38'. The inlet port 41' and the stationary housing is similarly connected to a pintle inlet opening 42' which is similarly connected to axial passages which connect to three inlet ports like outlet ports 36', 37' and 38' on the opposite side of the pintle as shown in FIGS. 1 and 2.

The pintle 16' has a cylindrical supporting portion 20' which is cylindrical about the axis 26 and fits in the bore 23' to secure the pintle in the stationary housing 11' and has an enlarged eccentric portion 25' concentric with the pintle and spider axis 24'. This cylindrical supporting portion 20' of the pintle has the inlet and outlet ports and rotatably supports the cylindrical portion 54' of the spider 55'.

The bearing 82' is positioned on the cylindrical pintle portion 20' concentric with ring axis 26' and cooperates with a smaller diameter support member 81' suitably secured as by welding to the rear portion 74' which extends further toward the axis than in FIG. 1, so that the rotary housing 12' is supported on two bearings 82' and 77' which have the same diameter and which are preferably the same bearing.

This hydrostatic converter 10' functions as a pump or motor like the above hydrostatic converter 10.

It will be appreciated that terms such as top center and bottom center have been used for convenience in referring to the drawing and that the top center minimum volume position and the bottom center maximum volume position of the piston and cylinder units may be located in any other direction.

It will be appreciated that further modifications may be made in the above disclosed preferred embodiment.

What is claimed is:

1. In a hydrostatic converter, stationary support means, a spider member rotatably mounted on said support means for rotation about a spider axis, a ring member rotatably mounted on said support for rotation about a ring axis eccentric to said spider axis, piston and cylinder means mounted on said members for relative reciprocation in response to rotation of said members at the same speed, power means drivingly connected to a member to transmit power to and receive power from said last mentioned member and drive means connecting said members including a plurality of drive pins fixed to one of said members in a spaced annular series about the axis of said one member and cam openings in the other member in a similarly spaced annular series about the axis of said other member each having a leading circular cam segment surface and a trailing circular cam segment surface both being circular about the same center and located centrally on opposite sides of a radius through said center and cooperating with at least one of said drive pins in drive engagement and contact with one trailing circular cam surface and with at least one other of said drive pins in backlash preventing engagement and contact with an opposite leading cam surface of another cam opening at all times to cause said members to rotate at the same speed and said cam openings having opposed relief portions at the radially inner and outer portions between said leading and trailing circular cam segment surfaces completely disengaging the contact of the pins with the cam surface and the drive between individual pins and the cam surfaces as the pins move past the radially inner and outer relief portions of the cam openings so high radial forces are not produced.

2. The invention defined in claim 1 and each of said circular cam surfaces subtending an angle greater than the angle between said pins and not more than 120°.

3. The invention defined in claim 1 and each of said circular cam surfaces subtending an angle greater than the angle between said pins and not substantially in excess of twice the angle between said pins.

4. The invention defined in claim 1 and each of said circular cam surfaces and recesses subtending an angle of substantially 90° to limit radial forces.

5. The invention defined in claim 1 and said pin having a rotatable bearing ring contacting said cam and having a diameter at least substantially half as large as the cam diameter.

6. In a hydrostatic converter; a fixed housing member; a pintle member having a spider cylindrical bearing surface on a spider axis and inlet and outlet ports for connection to inlet and outlet lines; a spider having an internal cylindrical bearing portion rotatably mounted on said pintle bearing surface with an annular series of openings, and having a plurality of radially extending pistons having a fluid passage therethrough communicating with said openings and each having a hollow stem portion secured at one end to said cylindrical bearing portion around said openings and a piston head secured to the other end of said stem and having an external spherical surface; an annular portion secured to said bearing portion at one side of said pistons; a cup shaped cylinder cooperating with each piston having internal cylindrical walls engaging said spherical surface in sealing relation and each having a cup base; a rotary housing having an annular ring portion, a radial annular portion secured to said ring portion and located on each side of said ring portion and on each side of said spider and bearings on the inner diameter of each of said annular portions rotatably supporting said rotary housing on one of said members on opposite sides of said spider for rotation about a rotary housing axis eccentric to said spider axis; means solely connected to said base of each of said cup shaped cylinders supporting each cylinder on said ring portion for rotation with said ring and spider and reciprocation and tilting with respect to the associated piston; drive means drivingly connecting a pair of annular portions, the annular portion on said spider and one annular portion of said rotary housing including a plurality of circular openings in one of said pair of annular portions each having opposed circular cam surfaces located centrally on a diameter perpendicular to a radius through the cam center and relief portions at the radially inner and outer portions of the circular opening intermediate of said cam surfaces and a pin secured to the other of said pair of annular portions extending into each of said circular openings and while traversing said cam surfaces cooperating in drive engaging contact with said cam surfaces to transmit an indexing drive at the same speed between said rotary housing and said spider and while traversing said relief portions being completely disengaging and spaced from said cam and relief portions so radial forces are not produced and power shaft means drivingly connected to one of said spider and rotary housing.

7. The invention defined in claim 6 and said cam surfaces and recesses each subtending about 90°.

8. The invention defined in claim 7 and there being at least five pistons and a cam and pin drive between each piston.

9. The invention defined in claim 8 and said pins having a rotatable bearing thereon having an outer diameter contacting said cams and said diameter at least substantially half the diameter of the cams and a large inner diameter rotatably mounted on the large outer diameter of said pin.

10. In a hydrostatic converter; a stationary support; a first member mounted on said support for movement; a second member mounted on said support; piston means mounted on one member and cylinder means cooperating with said piston means to confine the operating fluid pressure in an operating chamber and mounted on the other member for relative reciprocation in response to relative movement of said members; power means drivingly connected to a member to transmit power to and receive power from said last mentioned of said members and said cylinder means being individual cylinders each having a thin cylindrical wall of lightweight construction which expands under said operating fluid pressure having a base end and a lip end positioned over said piston means, base means to close and seal the base end of said cylindrical wall, a thin cylindrical sleeve of lightweight construction incapable of independently confining said operating fluid pressure without expansion slidably positioned and sealably fitted on said piston means and said sleeve being positioned within and in spaced relation to said cylindrical wall to provide a space between said wall and sleeve opened to said operating chamber provided by the interior of said sleeve and cylinder between said base means and said piston means in any position and securing means to secure said sleeve to said wall and seal means between said wall and sleeve beyond said piston means in the position furthest from said base means adjacent said lip to provide operating fluid pressure within said sleeve and in said space outside said sleeve to provide balanced operating fluid pressure on both sides of said sleeve to minimize deflection of said lightweight sleeve.

11. The invention defined in claim 10 and said securing means being loose threads on the exterior of said sleeve and interior of said wall to provide said space therebetween and strength reinforcing ribs for a lightweight low deflection cylinder sleeve.

12. The invention defined in claim 10 and said piston means having a spherical surface engaging in line contact said cylindrical sleeve in all positions.

13. The invention defined in claim 12 and said securing means being loose threads on the exterior of said sleeve and the interior of said wall to provide said space therebetween and reinforcing ribs for a lightweight cylinder and the space being open to the cylinder within said sleeve at the base end of said threads.

14. In a hydrostatic converter, stationary support means, a spider member rotatably mounted on said support means for rotation about a spider axis, a ring member mounted on said support about a ring axis eccentric to said spider axis, piston means mounted on one member and cylinder means mounted on another member for relative reciprocation in response to relative rotation of said members, power means drivingly connected to one of said members to transmit power to and receive power from said last mentioned of said members and said cylinder means including a cylindrical wall having a base end and a lip end positioned over said piston means, a cylindrical sleeve positioned in contact with said piston means and within said cylindrical wall having a space between said wall and sleeve opened to the interior of said cylinder means beneath said piston means in all positions, securing means securing said sleeve to said wall, a seal between said wall and sleeve near the lip of said wall and means to close and seal the base end of said cylindrical wall to provide balanced fluid pressure on both sides of said sleeve to prevent distortion in a lightweight cylinder and said securing means being loose threads on the exterior of said sleeve and interior of said wall providing said space, reinforcing ribs and securing means securing said sleeve and wall together.

15. In a hydrostatic converter, a stationary housing, a pintle fixed in a stationary housing having a cylindrical bearing surface having an axis and inlet and outlet ports, a spider having an internal cylindrical bearing rotatably mounting said spider on said pintle cylindrical bearing surface for rotation about a spider axis including a plurality of radially extending pistons having a piston head with a spherical piston surface, a ring mounted for rotation on said stationary housing about an axis eccentric to said spider axis, a cup shaped individual cylinder positioned over each piston forming an operating chamber to confine the operating fluid pressure; means to mount said cup shaped cylinders on said ring for tilting reciprocating movement relative to said pistons during relative rotary movement of said spider and ring member, said cup shaped cylinders having a cup shaped member including a thin lightweight cylindrical wall portion incapable of confining said operating fluid pressure without expansion having a base end and a lip end and a base wall portion closing the base end, a thin cylindrical sleeve of lightweight construction incapable of confining said operating fluid pressure without expansion positioned on and in line seal contact with said piston within said cylindrical wall portion providing a space between said cylindrical wall portion and sleeve opened to the interior operating chamber of said cup shaped cylinder beneath said piston in all positions to receive fluid pressure therein and sealed at the lip end to said cylindrical wall to equalize the operating fluid pressure on both sides of said sleeve to prevent expansion and maintain said line contact seal.

16. The invention defined in claim 15 and said sleeve having external threads substantially throughout its length and said cylindrical wall portion having internal threads having a loose fit with external threads to provide said space therebetween and secure said sleeve to said wall portion.

17. In a hydrostatic converter, a stationary housing, a pintle fixed in a stationary housing having a cylindrical bearing surface having an axis and inlet and outlet ports, a spider having an internal cylindrical bearing rotatably mounting said spider on said pintle cylindrical bearing surface for rotation about a spider axis including a plurality of radially extending pistons having a piston head with a spherical piston surface, a ring mounted for rotation on said stationary housing about an axis eccentric to said spider axis, a cup shaped cylinder positioned over each piston having a cup shaped member including a thin lightweight cylindrical wall portion incapable of confining the operating fluid pressure without expansion having a base end and a lip end and a base wall portion closing the base end and a thin cylindrical sleeve incapable of confining the operating fluid pressure without expansion engaging said spherical piston in line seal contact positioned within said cylindrical wall portion, sealed at the lip end to said cylindrical wall portion and opened at the base end of said cylindrical wall portion to provide a space between said cylindrical wall portion and sleeve opened to the interior operating fluid pressure chamber in said sleeve of said cup shaped member between said base wall and piston in all positions to receive operating fluid pressure thereinto equalize the pressure on both sides of said sleeve to support said sleeve without expansion in said line seal contact, and means to mount said cup shaped cylinders on said ring and connected solely to the base wall portion of said cup shaped cylinders and said ring for rotation about said ring axis and for tilting and axial and peripheral movement relative to said pistons during relative rotary movement of said spider and ring member for peripherally equalizing pressure at said line contact seal.

18. The invention defined in claim 17 and said sleeve having external threads substantially the length of said sleeve and said cylindrical wall portion having similar internal threads having a loose fit with said external threads to provide therebetween said space and secure said sleeve to said wall portion.

19. In a hydrostatic converter; a stationary support; a spider rotatably mounted on said support for rotation about a spider axis; a ring rotatably mounted on said support for rotation about a ring axis eccentric to said spider axis; piston members and cooperating cylinder members; means to mount one member on said ring for movement relative to the ring and means to mount the other member on said spider for relative reciprocation of said members in response to rotation of said spider and ring; said means to mount one member on said ring including an external cylindrical segment bearing surface on said one member, an internal complete cylindrical bearing surface on said ring and a nonfriction bearing between said bearing surfaces on each of said one members and said ring having a plurality of rolling members engaging each of said external cylindrical bearing surfaces and said internal cylindrical bearing surface and a cylindrical segment cage guiding and confining said rolling members for only rolling movement on said bearing surfaces and to locate said cage spaced between said bearing surfaces and stops on said cage and said one member to limit relative movement of said cage and said one member to keep each of said bearings between its member and said ring.

20. In a hydrostatic converter; a pintle having a spider cylindrical bearing surface about a pintle axis; rotary housing bearing surfaces on each side of said spider bearing surface and coaxial about a shaft axis eccentric to said spider axis and inlet and outlet ports for connection to inlet and outlet lines; a power shaft rotatably mounted on one of said rotary housing bearings on said pintle for rotation about said shaft axis; a rotary housing drivingly connected to said power shaft and rotatably mounted on said pintle on said rotary housing bearing surfaces about said shaft axis; a spider having an internal cylindrical bearing rotatably mounted on said spider bearing surface and having a plurality of radially extending pistons having a fluid passage therethrough and terminating in a piston head having an external spherical surface; a cup shaped cylinder cooperating with each piston having internal cylindrical walls engaging said spherical surface in sealing relation and each having a cup base with a pivot ball fixed on and extending from the cup base coaxially of said cylindrical wall; said rotary housing having an annular ring portion with a plurality of spherical seats for each of said pivot balls to pivotally mount the cylinder cups on said ring; a pair of annular wall portions each mounted on said rotary housing bearing surfaces and said pair of annular walls being secured together exteriorly of said ring.

21. The invention defined in claim 20 and said pintle being a one-piece member one of said rotary housing bearings being smaller in diameter than said spider bearing surface and being entirely within said spider cylindrical bearing surface and the other being larger and completely outside said spider cylindrical bearing surface so said spider and housing assembly can be axially moved on said pintle.

22. In a hydrostatic converter; a pintle having a spider cylindrical bearing surface about a spider axis, a rotary housing bearing surface on each side of said spider bearing surface and coaxial about a shaft axis eccentric to said spider axis and inlet and outlet ports for connection to inlet and outlet lines; a power shaft rotatably mounted on one of said rotary housing bearings on said pintle for rotation about said shaft axis; a rotary housing drivingly connected to said power shaft and rotatably mounted on said pintle on said rotary housing bearing surfaces about said shaft axis, a spider having an internal cylindrical bearing rotatably mounted on said spider bearing surface and having a plurality of radially extending pistons having a fluid passage therethrough and terminating in a piston head having an external spherical surface; a cup shaped cylinder cooperating with each piston having internal cylindrical walls engaging said spherical surface in sealing relation to define a variable volume cylinder chamber and each having a cup base with a pivot ball fixed on and extending from the cup base on the axis of the cylindrical walls; said rotary housing having an annular ring portion with a plurality of spherical seats for each of said pivot balls to pivotally mount the cylinder cups on said ring; a drive disc secured to said spider and extending radially adjacent a portion of said rotary housing and having a plurality of circular openings each having opposed circular cam surfaces centered on a diameter perpendicular to a radius through the cam center and relief portions at the radially inner and outer intermediate portions of the circular opening and a pin secured to said rotary housing member extending into each of said circular openings, moving in a circular path and while moving past said cam surfaces engaging with said cam surfaces to transmit an indexing drive from said rotary housing to said spider and while moving past said relief portions being free of said cam surfaces and relief portions.

23. The invention defined in claim 22 and said cup shaped cylinder having a sleeve loosely threaded inside said cylinder and sealed only at the lip end to provide therebetween a space between the cylinder and sleeve connected to the cylinder chamber to provide a pressure balanced sleeve.

24. In a hydrostatic converter; a fixed housing, a pintle fixed in said fixed housing having a spider cylindrical bearing surface about a spider axis and inlet and outlet ports therein for connection to inlet and outlet lines; said fixed housing having a pair of coaxial rotary housing bearings one on each side of said spider bearing surface and eccentric to said spider axis; a rotary housing having an annular ring portion with an internal cylindrical bearing and having spaced side walls rotatably mounted on said rotary housing bearings; a spider having an internal cylindrical bearing rotatably mounted on said spider bearing surface and having a plurality of radially extending pistons having a fluid passage therethrough and terminating in a piston head having an external spherical surface; a cup shaped cylinder cooperating with each piston having an internal cylindrical wall engaging said spherical surface in sealing relation and each having a cup base with a cylindrical segment bearing surface transverse to said cylindrical wall; a power shaft fixed to said pintle; bearing means between each said cylindrical bearing surfaces on said cup base and said ring to mount the cylinder cups on said ring; said bearing means including a cylindrical segment cage, a plurality of rollers rotatably mounted in said cage parallel with the axis of said cylindrical bearing surfaces and supporting said cage for free relative movement between said bearing surfaces and stops on said cage and cylinder to limit relative movement of said cage and cylinder substantially to the movement required during excursion movement of said cup relative to said ring; and a drive disc secured to said spider and extending radially adjacent a wall of said rotary housing and said wall having a plurality of circular openings each having opposed circular cam surfaces centered on a diameter perpendicular to a radius through the cam center and relief portions at the radially inner and outer intermediate portions of the circular opening and a pin secured to said disc extending into each of said circular openings and while traversing said cam surfaces cooperating with said cam surfaces to transmit an indexing drive from said rotary housing to said spider and while traversing said relief portions being free of said cam surfaces and relief portions.

25. The invention defined in claim 24 and said rotary housing having a one-piece construction having an opening in one wall for mounting said rotary housing on a rotary housing bearing and said opening having a diameter just sufficiently large to receive said spider with said cylinders assembled thereon all in the retracted position.

26. In a hydrostatic converter; a fixed housing member; a pintle member fixed in said fixed housing member having a spider cylindrical bearing surface about a spider axis and inlet and outlet ports therein for connection to inlet and outlet lines; one of said members having a pair of coaxial spaced rotary housing bearings one on each side of said spider bearing surface and eccentric to said spider axis; a unitary one-piece rotary housing having an annular ring bearing portion and spaced sidewalls having bearing openings rotatably mounted on said spaced rotary housing bearings; a spider having an internal cylindrical bearing rotatably mounted on said spider bearing surface; a plurality of pairs of pistons and cylinders, one mounted on said spider and one having bearing means for mounting on said ring bearing portion for relative reciprocation in response to relative rotation of said spider member and ring member; and said unitary one-piece rotary housing having a one-piece construction having one bearing opening in one wall for mounting said rotary housing on one rotary housing bearing having a diameter just sufficiently larger than the diameter of the assembly of said spider with said cylinders and pistons assembled thereon all in the retracted position to axially receive said assembly to simplify the assembly operation.

* * * * *